United States Patent
Solana Lopez

(10) Patent No.: US 12,380,423 B2
(45) Date of Patent: Aug. 5, 2025

(54) SHORT-RANGE TRANSMISSION OF RECEIPT DATA WITHOUT CONTACT IDENTIFIERS

(71) Applicant: PAYPAL, INC., San Jose, CA (US)

(72) Inventor: Eduardo Alejandro Solana Lopez, Danderyd (SE)

(73) Assignee: PAYPAL, INC., San Jose, CA (US)

( * ) Notice: Subject to any disclaimer, the term of this patent is extended or adjusted under 35 U.S.C. 154(b) by 33 days.

(21) Appl. No.: 18/336,845

(22) Filed: Jun. 16, 2023

(65) Prior Publication Data
US 2024/0420111 A1    Dec. 19, 2024

(51) Int. Cl.
G06Q 20/32    (2012.01)

(52) U.S. Cl.
CPC ..... G06Q 20/3255 (2013.01); G06Q 20/3278 (2013.01)

(58) Field of Classification Search
CPC .................. G06Q 20/3255; G06Q 20/3278
See application file for complete search history.

(56) References Cited

U.S. PATENT DOCUMENTS

| 9,805,370 | B1 | 10/2017 | Quigley et al. | |
|---|---|---|---|---|
| 10,366,378 | B1 | 7/2019 | Han et al. | |
| 2007/0044146 | A1* | 2/2007 | Murase | G06F 21/33 713/173 |
| 2013/0024364 | A1 | 1/2013 | Shrivastava et al. | |
| 2015/0032480 | A1* | 1/2015 | Blackhurst | G06Q 40/08 705/4 |
| 2018/0157336 | A1 | 6/2018 | Harris et al. | |
| 2019/0244248 | A1 | 8/2019 | Purves et al. | |
| 2020/0082402 | A1* | 3/2020 | Patel | G06Q 20/405 |
| 2021/0224808 | A1* | 7/2021 | Al-Ansari | G06Q 20/40145 |
| 2021/0272101 | A1* | 9/2021 | Kalgi | G06Q 20/34 |
| 2023/0222476 | A1* | 7/2023 | Lim | G06K 7/10 705/73 |

(Continued)

OTHER PUBLICATIONS

"Show a virtual receipt on the terminal," 11 pages [online], [retrieved on Sep. 18, 2023]. Retrieved from the Internet: <URL: https://docs.adyen.com/point-of-sale/shopper-engagement/display-data/display-receipt/>.

(Continued)

*Primary Examiner* — Scott C Anderson
(74) *Attorney, Agent, or Firm* — Haynes and Boone, LLP

(57) ABSTRACT

There are provided systems and methods for short-range transmission of receipt data without contact identifiers. A user may engage in a transaction with another user, such as a purchase of goods, services, or other items from a merchant at a physical merchant location. The merchant may provide options to receive a receipt, where conventional digital receipt transmission would require the user to enter their contact information, such as an email address or phone number. Instead, the user may be provided with an option to receive a digital version of the receipt via short-range wireless communications without entering contact information. A message may be generated having a webpage address or another identifier allowing for retrieval of the digital receipt from a storage system, and the message may then be broadcast locally to the user's device. The broadcast may the cause the user's device to load and present the digital receipt.

20 Claims, 6 Drawing Sheets

(56) References Cited

U.S. PATENT DOCUMENTS

2023/0245124 A1* 8/2023 Patel .................. G06Q 20/0855
705/64

OTHER PUBLICATIONS

Frank, Felix "bill.place: Sparkassen starten Pilotprojekt für digitalen Kassenbeleg," 5 pages [online], [retrieved on Sep. 18, 2023]. Retrieved from the Internet: <URL: https://stadt-bremerhaven.de/bill-place-sparkassen-starten-pilotprojekt-fuer-digitalen-kassenbeleg/>.
Levine, Roisin, "A surge in contactless payments will lead to the adoption of contactless receipts as a standard," Medium, Oct. 1, 2020, 4 pages [online] <https://blog.tryflux.com/a-surge-in-contactless-payments-will-lead-to-the-adoption-of-contactless-receipts-as-a-standard-636142dd8a2e>.
International Search Report and Written Opinion for Application No. PCT/US2024/33298, mailed on Sep. 5, 2024, 13 pages.

* cited by examiner

SHORT-RANGE TRANSMISSION OF RECEIPT DATA WITHOUT CONTACT IDENTIFIERS

TECHNICAL FIELD

The present application generally relates to digital data processing and transmission and more particularly to providing privacy protected and short-range wireless data transmissions of transaction receipt data without requesting user contact identifiers.

BACKGROUND

Users may utilize online transaction processors for processing payments between different entities through device applications and digital accounts. Further, these online transaction processors may also provide payment options for in-person transaction processing and use at merchant locations. In this regard, merchants may utilize in-person payment terminals, such as point-of-sale (POS) devices that may include components and modules for local wireless exchanges of data and transaction processing. Merchants may implement payment services and processing functionalities from transaction processors through these POS devices and/or other payment terminals. Users may then pay utilizing payment instruments and/or funds, such as cash, credit or debit cards, mobile applications and digital wallets, and the like. Conventionally, merchants provided paper or other physical receipts to record and document transaction processing and payment, which users may later utilize for returns, tax purposes, budgeting, and the like. However, when processing and completing a payment, it has become increasingly popular and prevalent for merchants to provide digital receipts, such as through email or text.

This process for digital receipt provision and/or transmission to the user requires the user to enter a contact identifier or other user and/or contact information, such as an email address or phone number for text messages. This reveals personal and private information to the merchant and/or other services providers engaged in this process, which may not be desirable for a user that wishes to protect their privacy. Additionally, merchants, service providers, and entities that obtain this information may utilize the information to transmit unwanted advertisements or other spam communications, or otherwise contact the user when the user does not desire such communications and outreach. Further, due to threats of cyber-attacks, phishing schemes, and malware that may compromise the user's account, the user and online transaction processor may desire to enforce further privacy protections, which may be required by law, regulations, and/or company policies. Thus, it is desirable for merchants to provide a process to digitally communicate data to users, such as receipt data, without requiring the user to proffer personal data or contact identifiers during checkout.

BRIEF DESCRIPTION OF THE DRAWINGS

FIG. 4 is a flowchart of an exemplary process for short-range transmission of receipt data without contact identifiers, according to an embodiment.

Figure 1:
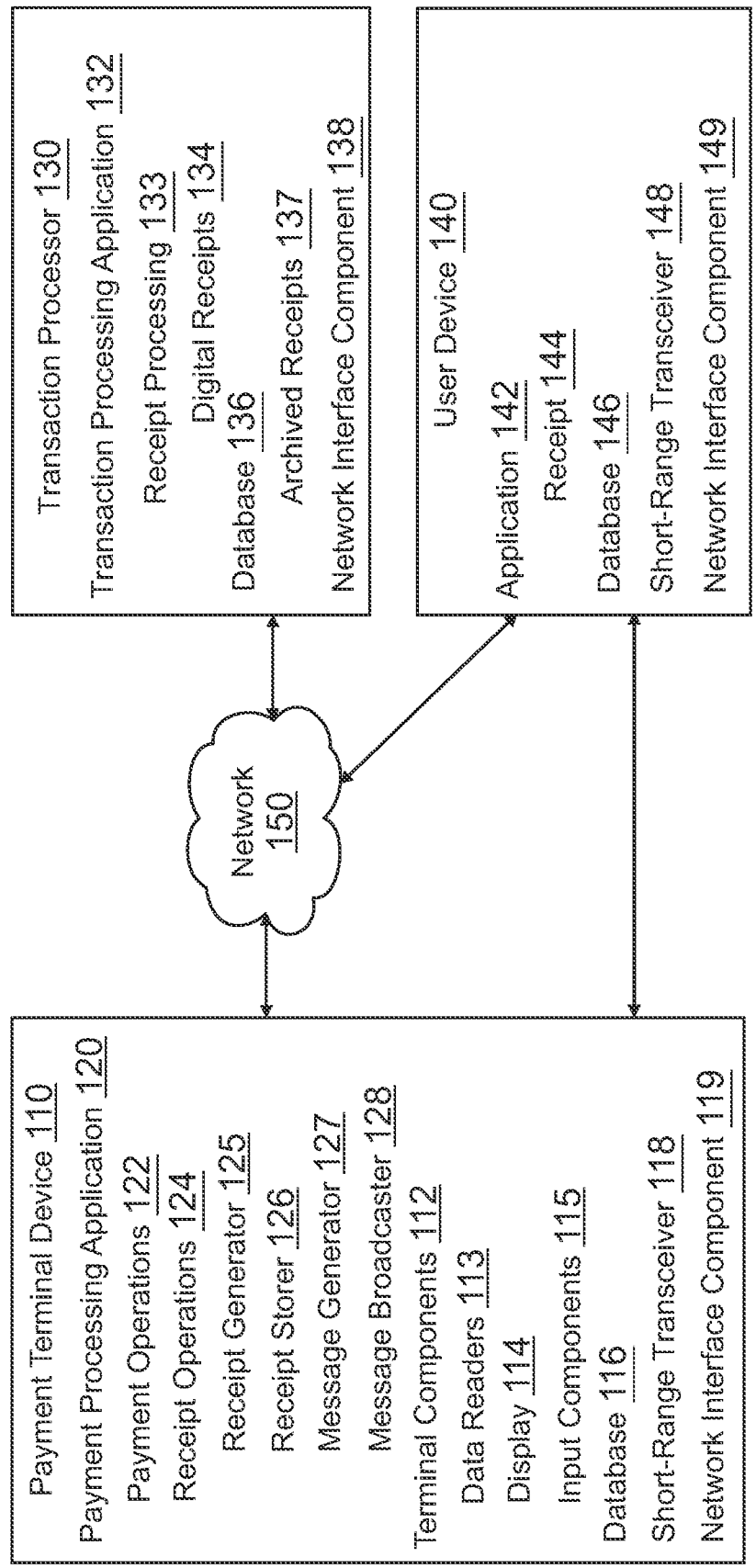
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for short-range transmission of receipt data without contact identifiers. Systems suitable for practicing methods of the present disclosure are also provided.

A user may utilize a digital account, payment card, and/or other funding source to process payments through an electronic payment and/or transaction network associated with a backend payment processor or other entity on the network. An identifier may be linked to a digital account of the user with an online transaction processor, such as a payment service provider (e.g., PAYPAL®) which may provide electronic transaction processing services to users through the account and one or more, real-world physical locations, websites, and/or applications of the online transaction processor or a merchant. The online transaction processor may include an integration with the electronic payment network (e.g., for payment cards, tokens, and the like) that allows for data exchange and communications between the two networks, such as to process transactions (e.g., approve or decline, and well as request monetary payments, transfers, conversions, etc.) and issue receipts or other transaction histories. Further, this payment network may provide data communications and backend processing devices that provide for interaction with frontend merchant, POS, and/or payment terminal processing devices that process transactions. In some embodiments, such frontend merchant devices may include POS devices and/or payment terminals processing payments using cash, check, and/or payment cards through near field communications (NFC), radio frequency identification (RFID) fields and communications, Bluetooth or WiFi communications, infrared scanners and/or communications, EMV chip readers, magnetic stripes and/or emulation readers, and other in-person and/or local data transfers.

However, to utilize such payment mechanisms, user contact identifiers and/or other personal data may be requested and/or required for communication with the user. Conventionally, during transaction processing, a receipt is provided that documents an approval and processing of the transaction or a declination and corresponding reasons (e.g., communication failure, insufficient funds, error, etc.). Receipts have become increasingly provided digitally instead of physically through printed receipts, which requests that a user enter their contact information (e.g., name, email address, phone number, etc.). For example, sales receipts are currently printed, transmitted by SMS/MMS, or sent via email. However, input of contact identifiers and other contact data reveals private or personal information for the user, or otherwise compromises the user's anonymity, so that the merchant or other service providers may contact the user. Many merchants may disguise such processes as enrolling in reward systems as well. This is undesirable for many reasons related to privacy and privacy protection laws or regulations, big data mining and advertisements or other outreach, and the like. Thus, currently, only printed receipts retain the user's anonymity and privacy.

This may be incompatible with current and/or new privacy laws, protections, regulations, and/or policies, such as those to protect users' contact addresses and numbers, as well as for personally identifiable information (PII), private data, and the like. Thus, an online transaction processor, as discussed herein, may provide operations that allow for faster checkout using digital receipts that are provided via short-range wireless communications and data transmissions without having the user provide sensitive contact information. During checkout, a payment terminal device or other computing system may provide users with an option to "tap" to obtain their receipt, where the tap generally refers to an NFC or RFID tap that wirelessly communicates data over a short-range (e.g., 4-5 centimeters (cm) or less for NFC taps, which allows sharing of a small data payload between NFC devices and/or readers, however other distances are contemplated). A digital receipt may be generated based on the request for the receipt to be transmitted in this manner, which causes creation of a digital file and association with a particular webpage and/or webpage address. When requesting to broadcast the digital receipt and/or obtain through the short-range wireless communications and tap, the user is not required to enter contact or personal data, such as a contact identifier. Thus, the digital receipt provision process may continue independent of the payment terminal device or system obtaining such data.

The address may then be broadcasted using an NFC standard and message embedding that causes a browser application on a mobile device to open and execute the browser application and navigate to the webpage. The digital receipt file may then be loaded to the webpage, downloaded, or otherwise accessed and obtained via the webpage and address, which may occur without the user entering contact identifiers or other user contact information. Further, by utilizing short-range wireless communications (e.g., NFC communications limited to 4-5 cm of distance), theft of the digital receipt may be prevented or limited, and any device being placed in such a proximity during receipt transmission would be able to be seen by the merchant, user, or another to prevent access, identify the user, or take other steps to prevent misappropriation of data and potential fraud. Moreover, as the digital receipt may include information that a standard printed receipt has, which are generated to prevent revealing sensitive or financial information, other users obtaining the receipt would only be capable of viewing standard transaction information to limit fraud or malicious conduct.

In a typical scenario, a user may desire to purchase items via available funds, a payment card, and/or a software application with digital account at a real-world physical merchant location, such as a merchant storefront, retail location, or the like that provides in-person transaction processing through POS devices, payment terminals, and other merchant devices and systems. Selection of one or more items in an in-person transaction at a physical merchant location may require a payment instrument from the user for electronic transaction processing, which may be provided through a cash or other physical fiat currency, a payment card and embedded or encoded data (e.g., magnetic stripe, EMV chip, NFC chip, etc.), token, identifier, data package, or the like that is transmitted to a merchant device at the location. Payment may be made via short-range wireless communications (e.g., contactless payments via NFC, RFID, etc.) using a digital wallet with an online service provider or other transaction processor. A digital account with a service provider may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information.

The user may also be required to provide financial information, including digital account (e.g., credit/debit card) information, bank account information, gift card information, benefits/incentives, and/or financial investments, when processing transactions with merchants and/or other users or entities. Account creation may also be used to establish account funds and/or values, such as by transferring money into the account and/or establishing a credit limit and corresponding credit value that is available to the account and/or card. The service provider may provide computing services to send, store, and receive money, process financial instruments, and/or provide transaction histories. The service provider may also provide for tokenization of data for transaction processing. The application or website of the service provider, such as PayPal® or other online payment provider, may provide payments and the other transaction processing services. Moreover, the digital account may be utilized through one or more mobile applications for mobile devices or other software applications.

In order to pay for the transaction using the account (e.g., a transfer or payment to another user, merchant, or other entity), the user may provide the digital account or funding source information and/or may login to an account with the service provider through authentication information in a software application. When providing in-person payments through payment terminals and a mobile device, a digital wallet of an external wallet or service provider may be utilized with the account to provide data to the terminal or device wirelessly. In this regard, an identifier and/or digital token or other data may authorize and/or authenticate the user for their digital wallet use and/or a payment instrument in the digital wallet (e.g., the account with the online transaction processor), which may be transmitted to another party for payment processing via wireless communications. The data may be stored by and/or transferred using one or more storage mediums and/or wireless transceivers, such as an NFC/RFID component, fob, passive or active antenna, etc., a magnetic stripe or an EMV chip, a displayable code or data, or the like. A payment may then be issued to the other party to the transaction. Thereafter, a receipt or other transaction history may be optionally provided, or required to be offered/provided, to the user to document and record the transaction processing (including approval and payment or refusal and reason for refusal).

Thus, after payment processing, the POS or payment terminal device, or other merchant system and/or component, may prompt the user of whether the user would like a receipt and how the user would like to obtain the receipt. The user may select between options and/or have a preselection made (e.g., by the user, such as based on the user's past history, used payment instrument, loyalty account and/or preferences, or by the merchant). For example, the payment terminal device or other system may present options to select to obtain the receipt by paper/physical receipt, email, text message, or wirelessly (e.g., "tap to receive receipt" or the like) on a mobile device. If the user selects the wireless receipt transmission option, such as the tap option for wireless NFC, FRID, or other short-range wireless protocol transmission, the payment terminal may then initiate a process to wirelessly broadcast and/or transmit a digital receipt, or digital version/copy, of the receipt via short-range wireless communications. Further, the device or system may not ask, request, or require user contact information and/or identifiers when providing the digital receipt wirelessly at the merchant location and within a proximity range between the user mobile device and the POS device, payment terminal, or other merchant system. Thus, the process may proceed independently from requesting and receiving such personal and/or contact data.

A display device, component, or other output component may begin displaying instructions to receive the digital receipt wirelessly, such as an instruction to "tap" the user's mobile or wearable device (e.g., mobile smart phone, smart watch, etc.) to a particular component or area of the POS device, payment terminal, or the like. Such area may include the short-range wireless transmitter, antenna, or transceiver, which may provide for broadcasting of data for the digital receipt to nearby devices. The payment terminal may also display an indicator, message, or other information that indicates when and for how long the digital receipt is being broadcast, such as a "Tap Now!" or "Sending!" message to indicate the broadcasting is occurring.

In order to perform the broadcast of data that may send and/or populate the digital receipt on the user's mobile device, the POS or payment terminal device and/or merchant system may create data for the digital receipt and a data file, such as an extensible markup language (XML) or hypertext markup language (HTML) file or object that may be loaded by a webpage in response to navigation to and/or opening of a webpage address or link. In this regard, a transaction processor and/or online receipt storage system and databases may be utilized to generate the corresponding file and/or webpage corresponding to the digital receipt. The webpage or file may include information that a standard printed receipt may include, such as items or services, merchant location and/or merchant information, prices and costs, date and time, tax or other fees, tip or other additional gratuities and expenses, a user signature or authorization if required or input, and the like.

However, the receipt may not include and/or may be scrubbed from having any user contact or personal data. For example, the user may have selected not to proffer and provide a user contact identifier, which would then not be entered to the receipt. The file and/or webpage may then be stored, cataloged, and/or persisted to make available via the corresponding address for a period of time. For example, laws and regulations may require receipt storage for businesses and merchants for up to ten years. In such embodiments, a long-term storage option and/or database, such as with an online receipt storage system, may be used to store the corresponding file or other data loadable for the webpage in association with the webpage address for later retrieval and access by the user, merchant, or third-party reviewer (e.g., government, audit team, transaction processor, etc.).

The merchant's system, the online transaction processor, and/or the receipt storage system may then generate a message for broadcast via the short-range wireless communications utilized by the POS or payment terminal device, or other merchant system/component. For example, the message may be generated to include the webpage address in the message. In this regard, the message may have a field, portion, or the like that includes the webpage address, such as having the address embedded in a message header, body, etc. The message may automatically cause a computing device receiving the message to open or execute a web browser application and navigate to the webpage or populate an interface notification or element notifying the user of the webpage and whether the user would like to load the webpage in the browser application. The message may also cause other applications to open and/or load the webpage or data for the digital receipt in one or more interfaces. Such opening and/or loading may be done automatically or after accepting an interface prompt and request based on the computing device receiving the message. For example, a mobile device may be configured with NFC protocols and operations to receive NFC messages having web addresses embedded in a particular portion, which causes the mobile device to load and navigate to such address in a web browser application. This would then cause the webpage file to be loaded for the digital receipt and the digital receipt to display on the receiving mobile device.

In some embodiments, the device broadcasting or otherwise transmitting the message may detect a receipt of the message by the mobile device or other user computing device. For example, a mobile device may send a response ping acknowledging receipt. In other embodiments, receipt may be acknowledged through a navigation by the mobile device to the digital receipt with the online receipt storage and/or via the web address. However, in other embodiments, the device broadcasting the message and/or web address (e.g., uniform resource locator (URL) or other transmittable data for the digital receipts online location) may continue broadcasting for a set amount of time and end broadcasting after the set amount of time has passed. The message may continuously or periodically, such as in a cycle or repeated, for a set amount of time to allow for receipt. If the receipt is properly transmitted, the process may then end on the POS or payment terminal device's end.

However, the device may also prompt or be commanded to continue or repeat the broadcast to allow for retransmission or if the message and digital receipt was not received. In some embodiments, the POS or payment terminal device may provide other information to troubleshoot digital receipt transmission, such as by requesting that the user turn on NFC or other short-range wireless compatible components on the user's mobile device, bring the device within a certain proximity, and the like. If failures continue, the merchant and/or user may select an option for other transmission of the digital receipt, such as by a displayable code and encoded data (e.g., a Quick Response (QR) code). This may occur after prompting by the device if the process to wirelessly transmit fails a number of times or after a certain period of time. In this regard, a displayable code, which may be captured by a camera or other code scanner, may include encoded data for the digital receipt or web address to obtain the digital receipt. A display component may display the code, and the user's device may then capture the code to receive the digital receipt without entry of the user's contact data.

When the user's mobile device receives the message, the digital receipt may be loaded and may be made available as a webpage page in the browser application, Portable Document Format (PDF) version of the digital receipt, capturable or storable image, or the like. Thus, the user may download, copy, and/or store the digital receipt. After the user's mobile or other computing device receives the digital receipt, the user may perform additional actions with the receipt. For example, the user may send the receipt to another address, device, or endpoint, which may occur without the merchant's devices interacting and therefore retain the user's privacy. In some embodiments, the webpage and/or file for the digital receipt may include an executable operation with corresponding embedded interface element or selectable option to transmit the digital receipt to the other address, upload to cloud storage or an account with an online transaction processor for receipt storage and review. This may provide a copy of the digital receipt (e.g., in PDF or image form) for user review and storage. Further, without exposing the user's contact data to the merchant, the user may retain privacy and may further request that any data used to transmit the digital receipt elsewhere be scrubbed or hidden.

In this manner, digital receipt transmission and access by users may be made more anonymous and without requiring users to enter contact and/or personal data, thereby increasing online and digital user privacy protection. This allows merchant systems to be more regulatory compliant and provide customer-focused processes for privacy protection. Further, the operations provide faster and more efficient transmission of data for digital receipts, which does not required manual efforts and/or input to provide the contact data and communication channels required for receipt transmission. Therefore, a merchant system may be coordinated to provide data in faster, more secure, and more private processes, which improves merchant electronic transaction processing and data transmission systems.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a payment terminal device 110, a transaction processor 130, and a user device 140 in communication over a network 150. Payment terminal device 110 and/or user device 140 may be used to establish a transaction and process a payment for the transaction. In this regard, when the transaction is processed, the transaction data may be processed, such as between payment terminal device 110 and transaction processor 130. Payment terminal device 110 may then provide a receipt digitally, such as by transmission over short-range wireless communications to user device 140 without requiring user contact identifiers and other information.

Payment terminal device 110, transaction processor 130, and user device 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Payment terminal device 110 may be implemented using any appropriate hardware and software configured for wired and/or wireless communication with user devices, and may correspond to merchant devices, POS devices and registers, payment terminals, contactless payment transceivers and devices, and the like used for processing a transaction. Payment terminal device 110 may correspond to a merchant and/or merchant employee that processes payments and sales at a physical merchant location. In various embodiments, payment terminal device 110 may be implemented as a personal computer (PC), a payment terminal device with payment processing components, a smart phone, laptop/tablet computer, wristwatch with appropriate computer hardware resources, other type of wearable computing device, and/or other types of computing devices capable of transmitting and/or receiving data. Although only one device is shown, a plurality of device may function similarly.

Payment terminal device 110 of FIG. 1 contains a payment processing application 120, terminal components 112, a database 116, a short-range transceiver 118, and a network interface component 119. Payment processing application 120 may correspond to executable processes, procedures, and/or applications with associated hardware. In other embodiments, payment terminal device 110 may include additional or different modules having specialized hardware and/or software as required.

Payment processing application 120 may correspond to one or more processes to execute software modules and associated components of payment terminal device 110 to provide features, services, and other operations for payment processing over network 150 with transaction processor 130, which may include processes to transmit digital receipts via short-range wireless communications without using, requiring, or requesting contact data and/or other personal user data from users. In this regard, payment processing application 120 may correspond to specialized software utilized by a user of payment terminal device 110 that may be used to access a website or application (e.g., mobile application, rich Internet application, or resident software application) that may display one or more user interfaces that allow for interaction with the computing services of transaction processor 130 for payment processing. In various embodiments, payment processing application 120 may correspond to a general browser application configured to retrieve, present, and communicate information over the Internet (e.g., utilize resources on the World Wide Web) or a private network. For example, payment processing application 120 may provide a web browser, which may send and receive information over network 150, including retrieving website information, presenting the website information to the user, and/or communicating information to the website. However, in other embodiments, payment processing application 120 may include a dedicated application of transaction processor 130, a merchant system or merchant device, or other entity.

Payment processing application 120 may include payment operations 122, which may be used to process payments with users. For example, payment operations 122 may be used to receive and/or generate a transaction to purchase one or more items or services, such as by receiving item or service input and selection through item scanning, menu or interface selections and input, receipt of a transaction or order from another device or server (e.g., generated by user device 140 and provided to payment terminal device 110 for processing and/or fulfillment), and the like. Payment operations 122 may further request payment for the transaction, which may be provided using cash and merchant input, a check and merchant input and/or a check reader, a payment or gift card using a card reader (e.g., magnetic stripe reader, EMV or RFID chip reader, etc.), and/or a contactless payment terminal and component for mobile application payments from mobile devices (e.g., via NFC, RFID, QR code scanning, etc.). Payment processing application 120 may process a transaction and/or a payment request using payment data from one or more contactless payment devices, terminals, transceivers, or the like, as well as merchant input (e.g., cash or check transactions). Payment operations 122 to enter, receive, and process transaction and payment data may utilize terminal components 112, short-range transceiver 118, and/or network interface component 119. Thereafter, payment processing application 120 may be used to view the results of transaction processing and the like via one or more interfaces, which may include a receipt or other transaction history that may be transmitted to user device 140 or another endpoint/address and/or printable on a physical receipt. This may include short-range wireless transmissions of digital receipts or other receipt data independent of requiring a user to provide input for an email address, phone number, or the like for receipt data transmission.

Receipt operations 124 may be used to provide wirelessly transmitted digital receipts. In this regard, receipt operations 124 may include executable operations for or associated with a receipt generator 125, a receipt storer 126, a message generator 127, and a message broadcaster 128. Receipt operations 124 may be invoked and executed on transaction completion (e.g., approval or denial) and may be used to generate and provide a receipt to a user for their corresponding transaction using a receipt conveyance selection or route selected by the user or merchant. For example, receipt operations 124 may initially request that the user select whether to receive a paper physical receipt, receipt by email, receipt by text message, or "tap to receive" (e.g., receipt via short-range wireless communications, such as NFC communications). The first three aforementioned conveyance processes may proceed where the receipt is printed or the receipt is digitally generated and sent as a file, document, selectable link, or the like to the provided contact identifier.

If the fourth option to receive the receipt via an NFC or similar tap, or short-range wireless communications within a proximity range (e.g., bringing user device 140 within 4-5 cm of payment terminal device 110 and/or short-range transceiver 118 of payment terminal device 110 for NFC transmissions) is selected, receipt generator 125 may generate a digital version of the corresponding receipt or other transaction history. In some embodiments, the receipt, receipt data, and/or digital version of the receipt may be generated elsewhere and provided to payment terminal device. For example, the digital version of the receipt may be generated with or by a merchant device, transaction processor 130, or the like and loaded to payment terminal device 110 for use and provision to a user and/or device. The digital version of a receipt may correspond to a file, document, or data object that includes data for the receipt (e.g., items/services, prices and costs, payments, date and timestamp, merchant information, unique transaction and/or receipt identifier, etc.). For example, an XML or HTML file may be generated by receipt generator 125 and stored by receipt storer 126 at a network pathway and address (e.g., a webpage address for a webpage that loads data) accessible via a corresponding webpage address, link, loading event, or the like. The webpage address may navigate to the webpage that causes loading of the file from the corresponding pathway and stored with a receipt storage system, such as an online or cloud storage system, by receipt storer 126.

Message generator 127 may then be invoked by receipt operations 124 to generate a digital message or communication that may be broadcast via the short-range wireless communications to a device within a range or proximity of payment terminal device 110, such as user device 140 when user device 140 is tapped or placed within a certain range for NFC or similar transmissions. Message generator 127 may generate a message using a messaging protocol for the short-range wireless communications and protocol, such as an NFC transmittable message. The webpage address or other link, pathway, or the like may be added, embedded, or otherwise provided with the message so that the message may cause user device 140 to prompt for or automatically navigate to the webpage using the webpage address, which causes loading of the digital receipt from the corresponding file retrievable from the corresponding pathway. Once generated, message broadcaster 128 may be used to broadcast the message over short-range wireless communications. For example, message broadcaster 128 may utilize short-range transceiver 118 to transmit the message using a short-range wireless messaging protocol and technology. While short-range wireless communications, transmission, and protocols described herein may often refer to NFC, which may be used to transmit data between devices in close proximity or short range (e.g., 4-5 cm), other wireless technologies may also be used (e.g., RFID, Bluetooth, WiFi, etc.). The message may be broadcasted for a set amount of time, until received, and/or until a stoppage of broadcasting is requested. The message may be broadcast continuously or periodically and may be range limited to a certain proximity when transmitting. Receipt operations 124 to generate and transmit digital receipts in this wireless manner without utilizing contact identifiers and other personal data of users may utilize terminal components 112, short-range transceiver 118, and/or network interface component 119. If receipt transmission is unsuccessful, receipt operations 124 may be used to transmit the digital receipt through another conveyance process or channel. For example, the digital receipt, webpage address, or the like may be embedded or encoded in a displayable code, such as a QR code, for display and scanning or capture by user device 140 to process and receive the receipt. Examples of such digital receipt generation and provision operations via short-range wireless communications without contact identifiers are further discussed with regard FIGS. 2A-4 below.

In various embodiments, payment terminal device 110 includes other applications as may be desired in particular embodiments to provide features to payment terminal device 110. For example, the other applications may include security applications for implementing client-side security features, programmatic client applications for interfacing with appropriate application programming interfaces (APIs) over network 150, or other types of applications. In various embodiments, the other applications may include financial applications, such as banking applications and the like for payment processing. The other applications may include device interface applications and other display modules that may receive input from the user and/or output information to the user. For example, the other applications may contain software programs, executable by a processor, including a graphical user interface (GUI) configured to provide an interface to the user. The other applications may therefore use terminal components 112 of payment terminal device 110, such as a display 114 capable of displaying information to users and other output devices, including speakers.

Terminal components 112 of payment terminal device 110 may be used to provide additional functionality and assist in transaction and payment processing, as well as digital receipt providing including transmitting digital receipts locally over short-range wireless communications without using or requiring contact identifiers and the like from users. In this regard, terminal components 112 may include data readers 113, which may be configured to read data from payment cards, gift cards, mobile devices, key fobs, and the like. The data read from such devices may include payment data, and therefore data readers 113 may include magnetic stripe readers, EMV chip readers, NFC card of fob device readers, and the like. Terminal components 112 further includes display 114, which may be configured to output and display data to the user and/or merchant. Display 114 may be used during transaction processing to display transaction processing input, results, and the like. This may include prompts for payment data input, receipt conveyance channel selection, and the like. While broadcasting a message for a digital receipt via short-range wireless communications, display 114 may also be used to display when the message is being broadcast, if message transmission is successful or receipt acknowledged, and/or a remaining time or end of broadcast. Ending the broadcast may cause display 114 to provide a prompt to rebroadcast or transmit via another process, such as a QR code. In this regard, terminal components 112 further including input components 115, such as buttons, a keyboard, a mouse, a touch screen interface, and the like, which enable the aforementioned inputs and selections to be made.

Payment terminal device 110 may further include database 116 stored on a transitory and/or non-transitory memory of payment terminal device 110, which may store various applications and data and be utilized during execution of various modules of payment terminal device 110. Database 116 may include, for example, identifiers such as operating system registry entries, cookies associated with payment processing application 120 and/or the other applications, identifiers associated with hardware of payment terminal device 110, or other appropriate identifiers, such as identifiers used for payment/user/device authentication or identification, which may be communicated as identifying the merchant and/or payment terminal device 110 to transaction processor 130. Moreover, database 116 may include data for digital receipts and transmission of data for digital receipts including message to be or currently broadcasted, webpage addresses, data files and/or objects for digital receipts, and the like.

Payment terminal device 110 includes at least one short-range transceiver 118 adapted to communicate with user device 140 and/or other nearby devices, transceivers, and/or components through short-range wireless signaling and communications including NFC communications, RFID communications, Bluetooth, WiFi, infrared scanners and/or communicators, and the like. In various embodiments, short-range transceiver 118 may correspond to microwave, RF, infrared, Bluetooth, and NFC devices and components.

Payment terminal device 110 includes at least one network interface component 119 adapted to communicate with transaction processor 130 and/or other devices and servers over network 150. In various embodiments, network interface component 119 may include a WiFi component, a DSL (e.g., Digital Subscriber Line) modem, a PSTN (Public Switched Telephone Network) modem, an Ethernet device, a broadband device, a satellite device and/or various other types of wired and/or wireless network communication devices.

Transaction processor 130 may be maintained, for example, by an online service provider, which may provide processes to provide account services and process payments. In this regard, transaction processor 130 includes one or more processing applications which may be configured to interact with payment terminal device 110, user device 140, and/or another device/server to facilitate communications for transactions, payment processing, and receipt provision for merchants and users. Transaction processor 130 may be maintained by or include another type of platform or service provider, for example, a transaction processor such as PAYPAL®, Inc. of San Jose, CA, USA.

Transaction processor 130 of FIG. 1 includes a transaction processing application 132, a database 136, and a network interface component 138. Transaction processing application 132 may correspond to executable processes, procedures, and/or applications with associated hardware. In other embodiments, transaction processor 130 may include additional or different modules having specialized hardware and/or software as required.

Transaction processing application 132 may correspond to one or more processes to execute modules and associated specialized hardware of transaction processor 130 to process a transaction for item(s) with payment terminal device 110 and/or user device 140, which may be based on in-person, short-range wireless, and/or contactless payments, data transfers, communications, and the like. In this regard, transaction processing application 132 may correspond to specialized hardware and/or software used by users to establish accounts and/or engage with electronic transaction processing services. Accounts may each be created by providing personal and/or financial information to transaction processor 130 and selecting authentication credentials. In various embodiments, the financial information may include payment instrument information, such as account/card numbers and information. An account may be used to purchase items and/or transfer funds. The payment account may be accessed and/or used through a browser application and/or dedicated payment application. Transaction processing application 132 may process a payment and may provide a transaction history for transaction authorization, approval, or denial.

Transaction processing application 132 may correspond to a service of transaction processor 130 that may be utilized by end users, such as to perform electronic payments, transfers, and the like using one or more accounts and/or financial instruments. Transaction processing application 132 may also include or utilize different processors, engines, or models as required for an authentication, account setup and maintenance, electronic transaction processing, deposit and/or withdrawal, dispute resolution, and the like. Transaction processing application 132 may include one or more API integrations and/or interactions with payment terminal device 110 and/or payment networks in order to detect, receive, and monitor transaction data for approval and/or declination, as well as store and manage receipts using receipt processing 133. For example, users may upload and/or provide digital receipts 134 for storage by transaction processor 130 and access or review through receipt processing 133. Receipt processing 133 may also provide generation and storage operations for digital receipts 134, such as those associated with storing XML/HTML files or other data for digital receipts and providing access through digital addresses that retrieve such data and load in an application, webpage, or the like.

Transaction processing application 132 may correspond to one or more processes to execute modules and associated specialized hardware of transaction processor 130 to process a transaction or provide another service to customers, merchants, and/or other end users and entities of transaction processor 130. In this regard, transaction processing application 132 may provide computing services to users, which may include electronic transaction processing and/or other computing services using accounts provided by transaction processor 130, such as in response to receiving transaction data for electronic transaction processing of transactions. In some embodiments, transaction processing application 132 may be used by users, such as a user associated with user device 140, to establish user and/or payment accounts, as well as digital wallets, which may be used to process transactions. Accounts may be accessed and/or used through one or more instances of a web browser application and/or dedicated software application executed by user device 140 and engage in computing services provided by transaction processing application 132. Computing services of transaction processing application 132 may also or instead correspond to messaging, social networking, media posting or sharing, microblogging, data browsing and searching, online shopping, and other services available through transaction processor 130.

In various embodiments, transaction processing application 132 may be desired in particular embodiments to provide features to transaction processor 130. For example, transaction processing application 132 may include security applications for implementing server-side security features, programmatic client applications for interfacing with appropriate application programming interfaces (APIs) over network 150, or other types of applications. Transaction processing application 132 may contain software programs, executable by a processor, including a graphical user interface (GUI), configured to provide an interface to the user when accessing transaction processor 130 via one or more of payment terminal device 110 and/or user device 140, where the user or other users may interact with the GUI to view and communicate information more easily. In various embodiments, transaction processing application 132 may include additional connection and/or communication applications, which may be utilized to communicate information to over network 150.

Additionally, transaction processor 130 includes database 136. Database 136 may store various identifiers associated with user device 140. Database 136 may also store account data, including payment instruments and authentication credentials, as well as transaction processing histories and data for processed transactions. Database 136 may store received data associated with a user, such as transaction data and spending limits on electronic transaction processing. Further, database 136 may be used to store data for digital receipts 134, including archived receipts 137 and other data that may be archived or otherwise stored for a period of time (e.g., based on a regulatory requirement, law, policy, or the like). For example, archived receipts 137 may be associated with transaction and other receipt data, a webpage address, a container or other webpage object to load the receipt data, and the like.

In various embodiments, transaction processor 130 includes at least one network interface component 138 adapted to communicate with user device 140, payment terminal device 110, and/or another device/server over network 150. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

User device 140 may be implemented using any appropriate hardware and software configured for wired and/or wireless communication with merchant devices, payment terminals, contactless payment transceivers and devices, and/or transaction processor 130 for processing a transaction and receiving a digital receipt independent or without of providing or inputting data that may be used to contact a user or other personal data of the user. User device 140 may correspond to a user that processes payments and sales through an executable software application. In various embodiments, user device 140 may be implemented as a personal computer (PC), a smart phone, laptop/tablet computer, wristwatch with appropriate computer hardware resources, other type of wearable computing device, and/or other types of computing devices capable of transmitting and/or receiving data. Although only one computing device is shown, a plurality of computing device may function similarly.

User device 140 of FIG. 1 contains a application 142, a database 146, and a network interface component 149. Application 142 may correspond to executable processes, procedures, and/or applications with associated hardware. In other embodiments, user device 140 may include additional or different modules having specialized hardware and/or software as required.

Application 142 may correspond to one or more processes to execute software modules and associated components of user device 140 to provide features, services, and other operations for a user over network 150, which may include accessing and utilizing computing services provided by transaction processor 130. In this regard, application 142 may correspond to specialized software utilized by a user of user device 140 that may be used to access a website or application (e.g., mobile application, rich Internet application, or resident software application) that may display one or more user interfaces that allow for interaction with the computing services of transaction processor 130. In various embodiments, application 142 may correspond to a general browser application configured to retrieve, present, and communicate information over the Internet (e.g., utilize resources on the World Wide Web) or a private network. For example, application 142 may provide a web browser, which may send and receive information over network 150, including retrieving website information, presenting the website information to the user, and/or communicating information to the website. In this regard, application 142 may be activated, opened, and/or executed in response to a message from payment terminal device, which may cause loading of receipt 144 based on embedded or encoded data, such as a webpage address with a corresponding message protocol to prompt for navigation to or automatically navigate to receipt 144. However, in other embodiments, application 142 may instead correspond to a dedicated or mobile software application of transaction processor 130, a merchant, or another entity, which may allow for opening and/or navigating to webpages, interfaces, and the like to display and output digital receipts and/or receipt 144.

Application 142 may be associated with account information, user financial information, and/or transaction histories including receipt 144. However, in further embodiments, different services may also be provided via application 142, including social networking, media posting or sharing, microblogging, data browsing and searching, online shopping, and other services available through transaction processor 130. Thus, application 142 may also correspond to different service applications and the like. When utilizing application 142 with transaction processor 130, application 142 may request processing of a transaction, such as a payment request with transaction processor 130. Thereafter, token or other data may be transmitted wirelessly, such as through short-range wireless communications for contactless or short-range payment protocols, devices, and technology. Application 142 may be used to view the results of transaction processing and the like via one or more interfaces, such as receipt 144 in response to receiving a broadcast of the correspond message for the digital receipt by payment terminal device 110.

In various embodiments, user device 140 includes other applications as may be desired in particular embodiments to provide features to user device 140. For example, the other applications may include security applications for implementing client-side security features, programmatic client applications for interfacing with appropriate application programming interfaces (APIs) over network 150, or other types of applications. The other applications may also include email, texting, voice and IM applications that allow a user to send and receive emails, calls, texts, and other notifications through network 150. In various embodiments, the other applications may include financial applications, such as banking applications. Other applications may include social networking applications, media viewing, and/or merchant applications.

The other applications may also include location detection applications, which may be used to determine a location for the user, such as a mapping, compass, and/or GPS application, which can include a specialized GPS receiver that determines location information for user device 140. The other applications may include device interface applications and other display modules that may receive input from the user and/or output information to the user. For example, the other applications may contain software programs, executable by a processor, including a graphical user interface (GUI) configured to provide an interface to the user. The other applications may therefore use components of user device 140, such as display devices capable of displaying information to users and other output devices, including speakers.

User device 140 may further include database 146 stored on a transitory and/or non-transitory memory of user device 140, which may store various applications and data and be utilized during execution of various modules of user device 140. Database 146 may include, for example, identifiers such as operating system registry entries, cookies associated with application 142 and/or the other applications, identifiers associated with hardware of user device 140, or other appropriate identifiers, such as identifiers used for payment/user/device authentication or identification, which may be communicated as identifying the user/user device 140 to transaction processor 130.

User device 140 includes at least one short-range transceiver 148 adapted to communicate with payment terminal device 110 and/or other nearby devices, transceivers, and/or components through short-range wireless signaling and communications including NFC communications, RFID communications, Bluetooth, WiFi, infrared scanners and/or communicators, and the like. In various embodiments, short-range transceiver 148 may correspond to microwave, RF, infrared, Bluetooth, and NFC devices and components.

User device 140 includes at least one network interface component 149 adapted to communicate with transaction processor 130 and/or other devices and servers over network 150. In various embodiments, network interface component 149 may include a WiFi component, a DSL (e.g., Digital Subscriber Line) modem, a PSTN (Public Switched Telephone Network) modem, an Ethernet device, a broadband device, a satellite device and/or various other types of wired and/or wireless network communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
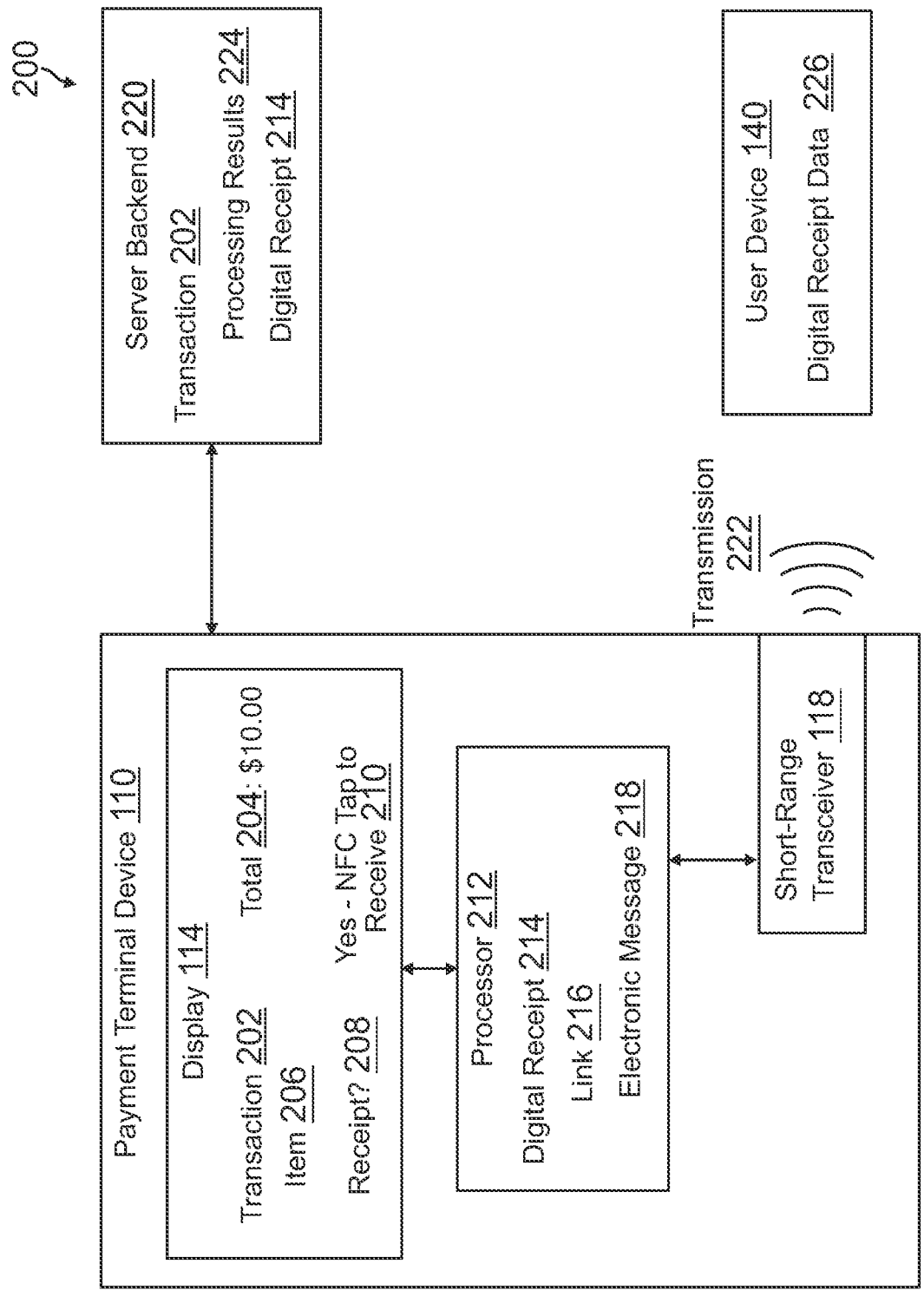
FIG. 2 is an exemplary system environment where a mobile device interacts with a payment terminal device or system to facilitate transmission of a digital receipt via short-range wireless communications without requiring input or user of a user contact identifier or information, according to an embodiment.

FIG. 2 is an exemplary system environment 200 where a mobile device interacts with a payment terminal device or system to facilitate transmission of a digital receipt via short-range wireless communications without requiring input or use of a user contact identifier or information, according to an embodiment. System environment 200 of FIG. 2 includes payment terminal device 110 interacting with user device 140, discussed in reference to system 100 of FIG. 1, to facilitate transmission of a digital receipt wirelessly and without requiring a contact identifier or other user information for receipt transmission. In this regard, a server backend 220 (e.g., one or more servers and/or back-end processors of transaction processor 130 discussed in reference to system 100) may provide digital receipt storage and loading for digital receipt presentation on user device 140.

In system environment 200 of FIG. 2, different interactions, data, and components are shown in order to generate and transmit a digital receipt wirelessly to user device 140 from payment terminal device 110 over a communication channel or to a contact address or account without requiring a contact identifier or other user contact information. Initially, payment terminal device 110 may be used to create, generate, and/or input a transaction, which may correspond to a user utilizing user device 140. The transaction may be for purchase of items and/or services from a merchant and the merchant or an employee of the merchant may be utilizing payment terminal device 110 to finalize and process the transaction. As such, display 114 may present information for a transaction 202 having a transaction total 204 for an item 206, such as a sandwich or another good, product, service, or the like from a merchant. Item 206 may have been scanned (e.g., based on a barcode, packaging, etc.) or entered/selected for purchase, and transaction total 204 may then be generated. Thereafter, the user and/or user device 140 may provide a payment instrument to pay for and process transaction 202.

Receipt option 208 may be provided on display 114, where the merchant or the user may select a wireless receipt transmission 210, such as a "tap to receive" option that does not require the user to enter their contact information and/or identifiers for receipt transmission. Instead, the receipt for transaction 202 may be transmitted via short-range wireless communications, which may be done by placing a corresponding device and/or transceiver (e.g., user device 140) within a wireless proximity range to payment terminal device 110 and short-range transceiver 118. This allows for NFC or other short-range wireless communications to transmit the data allowing the receipt to be loaded digitally on user device 140. For example, NFC data exchange format (NDEF) may be utilized, which may correspond to a standardized data format specification used for NFC data transmissions. NDEF may be used to encoded actions to NFC tags and/or exchange data between devices, which allow generating, transmitting, and/or reading NDEF messages by and between devices.

A processor 212 of payment terminal device 110 may generate a digital receipt 214 for transaction 202, which may correspond to a data file, object, or the like that may be stored, transmitted, and/or loaded in an application. Processor 212 may correspond to a hardware and/or software processor that may be configured to process data for transaction 202 and digital receipt 214, such as using operations of payment processing application 120. For example, an XML, HTML, or other data file may be loaded in a browser application, such as by navigation to a corresponding webpage using a webpage address. However, other applications and identifiers for online data retrieval may also be used. Digital receipt 214 may be associated with a link 216 to a webpage, network resource, and/or address that may load digital receipt 214 (e.g., a URL), or another identifier (e.g., a URI, etc.) may be associated with digital receipt 214. Thereafter, processor 212 may generate electronic message 218 to transmit digital receipt 214 by embedding, adding, or otherwise providing link 216 in the message structure or content, such as in a message field, that may cause digital receipt 214 to load from a webpage using link 216 in a corresponding application on user device 140.

Digital receipt 214 and/or other corresponding data, identifiers, addresses, and the like for receipt retrieval may be stored by processor 212 with server backend 220. Server backend 220 may correspond to a server and data storage system that may store receipts for a period of time, such as an extended period for accounting, audit, and the like, in a form or capacity to allow retrieval of digital receipt 214 using link 216 and/or other identifiers. Server backend 220 may process transaction 202 to provide processing results 224, which are then used to generate digital receipt 214 and store digital receipt 214. As such, server backend 220 may further correspond to an online transaction processor or other payment service that may electronically process transaction 202 and store digital receipt 214 for transaction 202, such as for compliance requirements.

Thereafter, short-range transceiver 118 may be used to transmit transmission 222, which may include electronic message 218 for digital receipt 214, to user device 140. Transmission 222 may correspond to a direct data transmission or communication, as well as broadcasts of data that may not be device specific. Further, transmission 222 may cause electronic message 218 to be received by user device 140, which prompts user device 140 and/or the corresponding user to open electronic message 218, navigate to a webpage using link 216 for digital receipt 214, and load digital receipt 214 on user device 140 as digital receipt data 226 displayable in one or more application interfaces. Further, such opening, navigating, and loading may be performed automatically on receipt of electronic message 218 from transmission 222 by user device 140. Digital receipt data 226 may include an option, application interface element, or the like that allows for transmission of digital receipt data 226 to another address, which would not risk exposure and transmission to the merchant corresponding to payment terminal device. The option may image, capture, or provide a data file for digital receipt data 226, and may further allow for local storage of digital receipt data 226 on user device 140. If transmission 222 fails, display 114 may further be used to display and output a code, such as a barcode or QR code, having encoded data that includes digital receipt 214, link 216, or other data for loading and providing digital receipt 214 on user device 140. Such output may be responsive to a failure to load digital receipt 214 through broadcast 22 and/or a command input on payment terminal device 110.

Figure 3A:
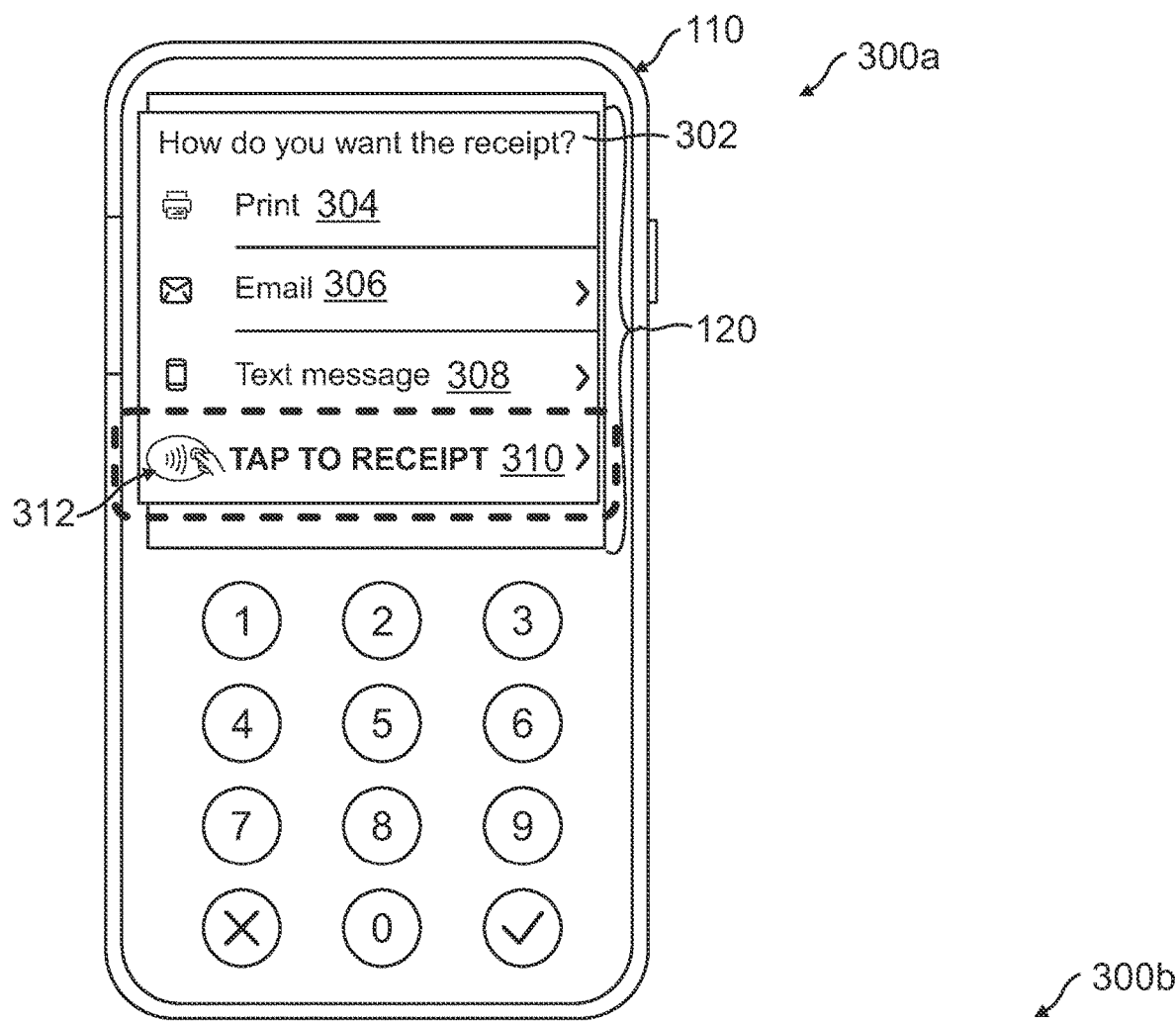
FIGS. 3A-3C are exemplary diagrams of payment terminals and mobile devices with corresponding user interface interacting to provide digital receipts via short-range wireless communications independent of requiring contact identifier input or use, according to an embodiment.
Figure 3B:
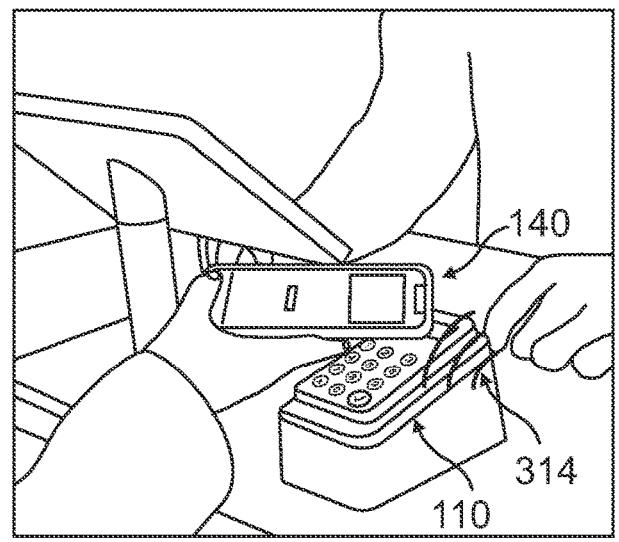
Figure 3C:
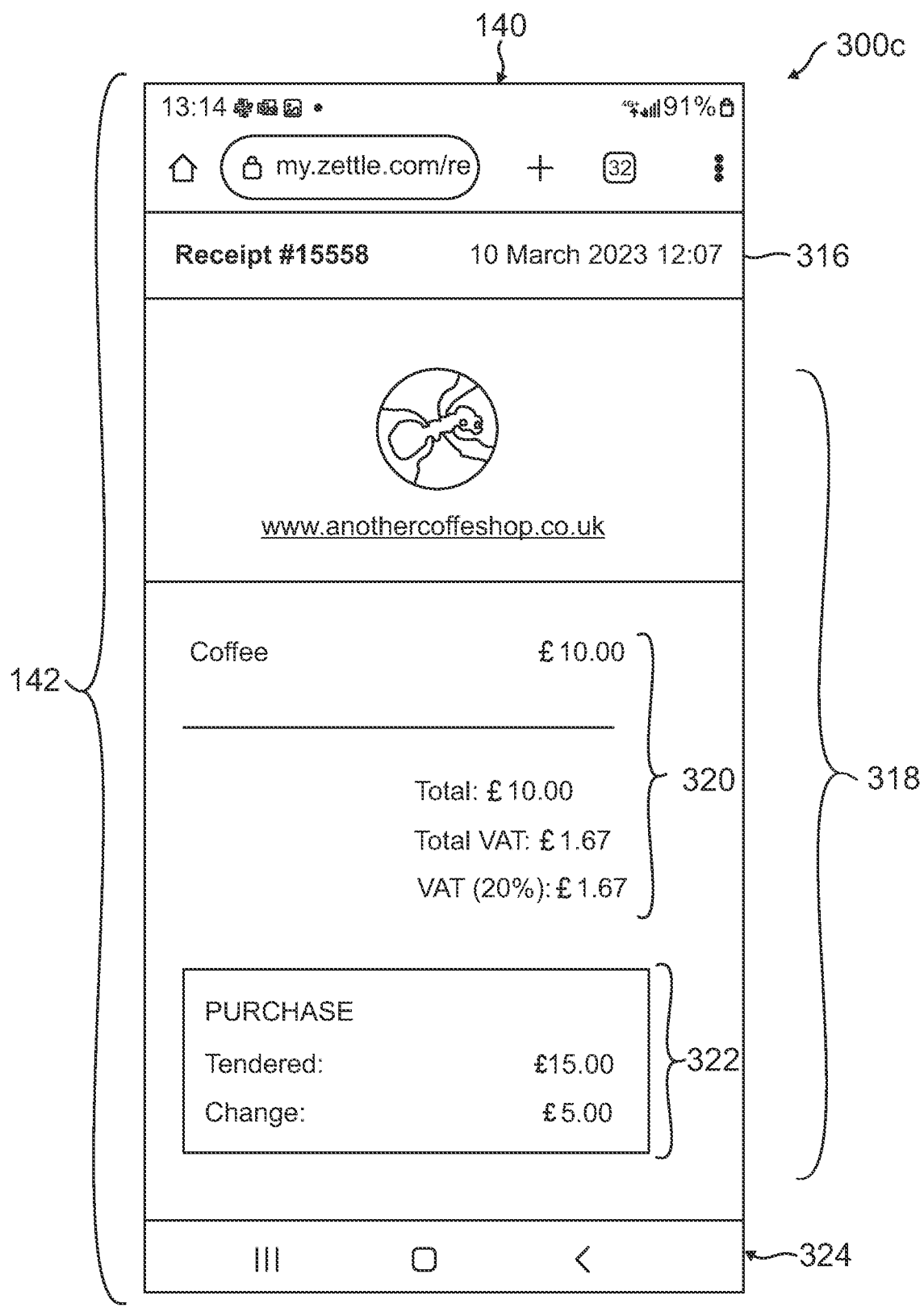

FIGS. 3A-3C are exemplary diagrams 300a-300c of payment terminals and mobile devices with corresponding user interface interacting to provide digital receipts via short-range wireless communications independent of requiring contact identifier input or use, according to an embodiment. For example, diagrams 300a-300c include payment terminal device 110 interacting with user device 140, discussed in reference to system 100 of FIG. 1, to facilitate transmission of a digital receipt wirelessly and without requiring a contact identifier or other user information for receipt transmission. In this regard, different user interfaces and user interactions to facilitate this transmission of a digital receipt are shown in diagrams 300a-300c.

In diagram 300a, payment terminal device 110 is shown displaying a receipt interface 302 of payment processing application 120 after completing a transaction and requesting whether provision of a receipt is requested by a user. For example, payment terminal device 110 may correspond to a card reader that may allow a user to enter or provide a payment instrument for payment processing with a corresponding transaction with a user. In some embodiments, payment terminal device 110 may correspond to a PAYPAL ZETTLE® payment terminal or device. Once payment has been provided and processed, payment processing application 120 may transition to an interface that requests whether the user would like a receipt to be provided. A merchant or the user may then select an option in receipt interface 302 to provide the receipt to the user through one or more communication channels, objects, or mediums, where entry may be made through an input component (e.g., keypad or keyboard, touch screen, etc.).

Receipt interface 302 of payment processing application 120 in diagram 300a displays four options for receipt transmission, although less, more, or different options may also be displayed. For example, a print option 304 in receipt interface 302 may cause a corresponding printer or other component to provide a physical receipt, such as a paper copy of the receipt for the corresponding transaction. An email option 306 in receipt interface 302 may allow the user to receive the receipt digitally to an email address that the user enters or selects from previous entry, while text option 308 allows the user to enter or select a phone number or other contact identifier for text message receipt. Receipt interface 302 further provides a "tap to receipt" option 310 that allows the user to receive the receipt via a "tap" or placing their device within a short-range proximity while an NFC, RFID, or other signal is being broadcast having a message that enables the digital receipt to be transmitted, received, and loaded (hence the tap of their device to receive or "tap to receipt"). Tap to receipt option 310 further includes an instruction icon 312 designating that the receipt is to be transmitted via NFC or other short-range wireless communications, and therefore a user should tap, or otherwise place, their corresponding device within a short proximity range to payment terminal device 110 to allow for data transmission and detection of a broadcast of the digital version or copy of the receipt.

Print option 304 merely provides a physical receipt that can be lost or damaged, while email option 306 and text option 308 both require a user to provide a contact identifier, such as an email address or phone number respectively, that would compromise the user's anonymity and allow the merchant or others to perform unwanted outreach and communications (e.g., advertisement, spam, customer surveys, etc.). As such, tap to receipt option 310 allows the user to digitally receive a copy of the receipt on a nearby computing device, such as a mobile or wearable device, without providing information that would allow the merchant or another entity to contact the user and provide unwanted communications. As such, tap to receipt option 310 provides an enhanced level of digital privacy and security to user's online identities and contact addresses or identifiers.

In diagram 300b, tap to receipt option 310 from diagram 300a has been selected and instruction icon 312 has informed the user to bring their computing device, shown as user device 140 or a mobile phone (although a wearable device, tablet, or other portable or moveable computing device may also be used), into a proximity range for short-range wireless communications (e.g., using NFC or similar protocols). A message on payment terminal device 110 may be encoded with, have embedded data for, or otherwise contain information for the digital receipt. For example, the digital receipt may be generated as a data file or object, which may be loaded via a webpage having a corresponding webpage address, which may allow persisting of the digital receipt for an amount of time as required by law, regulation, policy, or the like (e.g., with a cloud-based or long-term storage system). Such address may be added or embedded to a message field, where the message field includes or causes an executable process on user device 140 to load or prompt the user to load the webpage address and navigate to the webpage in a browser application on user device 140.

However, other identifiers and applications may also be used, such as a mobile application of a payment provider and a receipt identifier used to load the receipt data in an interface of the payment provider application. For example, the receipt information and/or data for the digital receipt may be encoded in HTML and provided over a network as a webpage, may be encoded in an XML file and stored where the HTML encoded webpage may serve as an online backup, may be encoded or provided in a PDF file and sent directly, or may be encoded or provided in a larger file size, such as a Portable Network Graphics (PNG) image type file or the like. In this regard, data size constraints of the file and communication channel (e.g., NFC alone or with network communications using links and locators) may be used to select a file type and/or receipt encoding process. Further, the user may select an option to receive and accept the digital receipt, which may be used to select the file type and encoded the digital receipt as the file type.

Thereafter, the message may be transmitted through short-range wireless communications, where the message may be transmitted through broadcast 314. Broadcast 314 may correspond to a short-range transmission by a component on payment terminal device 110 that occurs continuously or periodically over a time period and allows for conveyance of the message to user device 140. In this regard, user device 140 may detect broadcast 314, which may cause the message to load or prompt the user to load the digital receipt using a corresponding application. If broadcast 314 is not detected, payment terminal device 110 may repeat or continue transmission of broadcast 314 based on one or more commands or may instead move to display a barcode or QR code having encoded data for the digital receipt. Such transmission mechanisms may therefore not require the user to enter a contact identifier.

In diagram 300c, a receipt is shown loaded on user device 140. In this regard, application 142 is shown with an interface displaying a receipt 316, such as a webpage, message, or the like, for the corresponding digital version of a transaction receipt. The received message from payment terminal device 110 through broadcast 314 via short-range wireless communications may have caused application 142 to navigate to and load receipt 316. The digital receipt may be loaded from a webpage data file for the receipt, and receipt data 318 may be displayed in receipt 316 on the interface of application 142 (e.g., receipt 144 or other interface displayed by application 142). Receipt data 318 is shown as including transaction details 320 and a transaction payment 322.

Further, a navigation bar 324 is shown and, optionally, one or more storage options may also be presented with receipt data 318. Navigation bar 324 may allow a user to navigate to another webpage, as well as save, image, and/or forward receipt 316 to user device 140 and/or another device, digital address, or the like. The storage option(s) may similarly allow the user to store a PDF or other digital copy of receipt 316 and/or receipt data 318, image and store receipt 316 and/or receipt data 318 or send receipt 316 and/or receipt data 318 to an account for uploading and processing. A PDF (or other file type, such as a Word document, PNG image file, etc.) may be stored from a file provided to user device 140 via broadcast 314 and/or over a network or may be captured and/or generated by user device 140. The user may also select to have receipt 316 stored to a digital wallet, where a file, link to receipt 316 and/or receipt data 318, or the like may be stored with and/or in a digital wallet for later retrieval using the digital wallet and corresponding application, website, or another platform. In this regard, the user may opt-in for automatic storage in the digital wallet or may select to store on a per-receipt basis.

Figure 4:
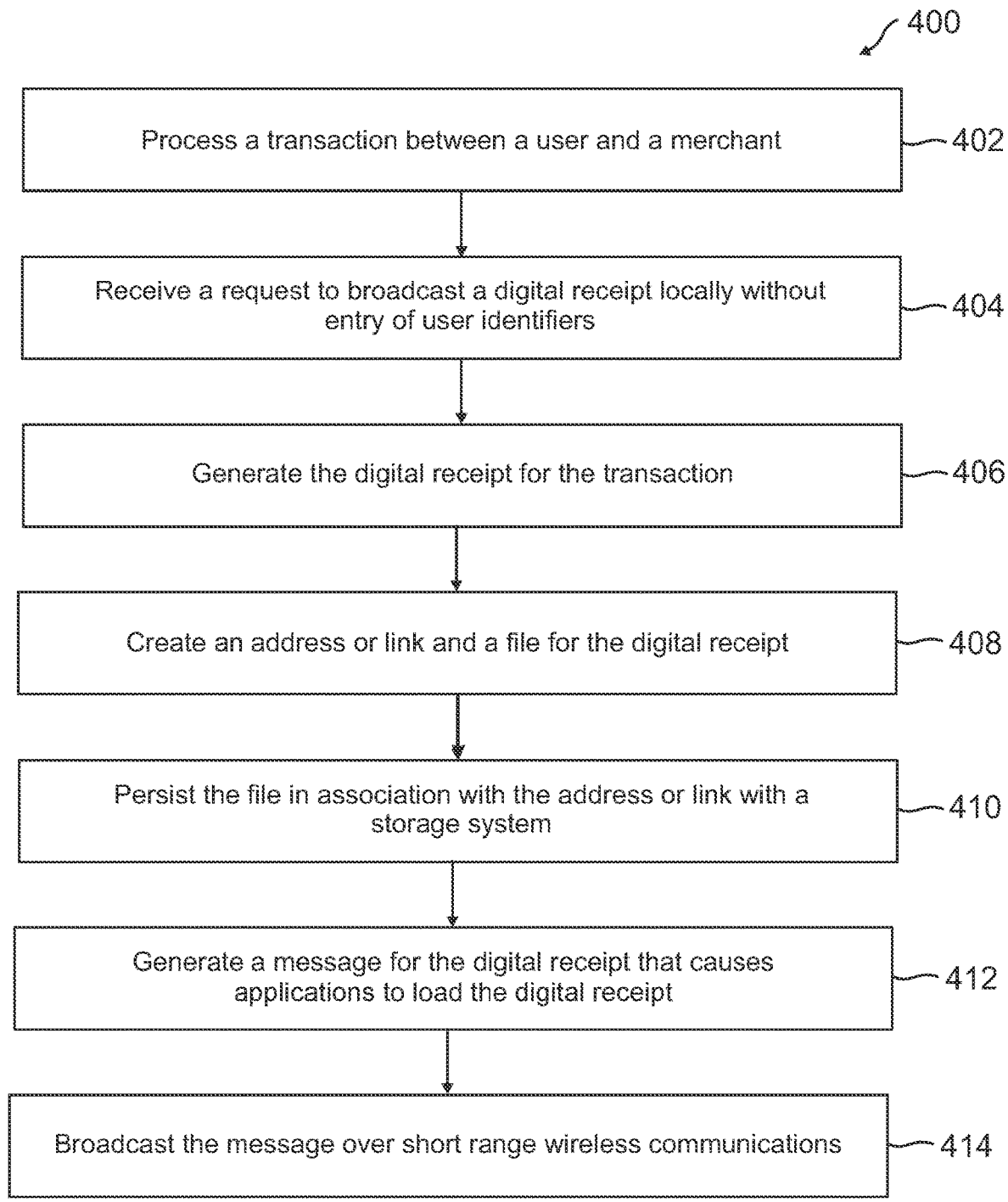
FIG. 4 is a set of exemplary user interfaces for a mobile device application when registering a digital account with an online transaction processor for use via a digital wallet of a separate digital wallet platform, according to an embodiment.

FIG. 4 is a flowchart 400 of an exemplary process for short-range transmission of receipt data without contact identifiers, according to an embodiment. Note that one or more steps, processes, and methods described herein of flowchart 400 may be omitted, performed in a different sequence, or combined as desired or appropriate.

At step 402 of flowchart 400, a transaction between a user and a merchant is processed. For example, payment terminal device 110 in system 100 of FIG. 1 may receive transaction data, such as from user input, data scans, and/or communications, and process the transaction with transaction processor 130. In some embodiments, user device 140 may also provide and/or process the transaction data, such as by providing a digital token or payment information for payment processing. Such interactions may also be shown by payment terminal device 110, user device 140, and server backend 220 in system environment 200 of FIG. 2. A user may enter into a transaction at a physical merchant location, such as a merchant storefront or retail location. There, the user may initiate and process a transaction with a corresponding merchant device including POS devices, merchant payment terminals, self or automated checkout registers, and other merchant checkout and payment devices. The user may pay for one or more items or services and may then provide a payment instrument for transaction processing and completion. On completion (e.g., payment processing and approval or declination based on insufficient funds, fraud detection or risk assessments, etc.), the merchant's device used for checkout and payment may display or output an option to provide a receipt to the user, which records the transaction or otherwise provides a history of the transaction (e.g., time, date, merchant information, items/services, prices and other costs or totals, etc.). Such option may include an option to send a text message or email with a digital version or copy of the receipt, print the receipt, or wirelessly transmit the digital version of the receipt.

At step 404, a request to broadcast a digital receipt locally without entry of user identifiers is received. In this regard, payment terminal device 110 in system 100 and system environment 200 may receive the request from user input and the like. Based on the outputted option for provision of the receipt for the transaction by the merchant's device, the user may select to receive the digital receipt via short-range wireless communications. This option may be selected in place of other options to allow the user to remain unknown and/or anonymous, or otherwise not provide contact or personal data to the merchant's device for receipt transmission. For example, the option may not require the user to enter a contact identifier, such as a name, phone number, email address, or the like. This may further ensure and protect the privacy of the user and limit or minimize spam and other unwanted communications by the merchant or another entity that may receive and/or access the user's preferred contact identifier.

At step 406, the digital receipt is generated for the transaction, such as by payment processing terminal 110 and/or transaction processor 130. In this regard, a receipt may be generated on-device by payment terminal device 110 (e.g., for a cash transaction), or may be generated by payment terminal device 110 with a backend transaction processor (e.g., transaction processor 130, which may provide receipt generation and/or processing through server backend 220). A data file for the digital receipt maybe generated by creating a PDF file, image and/or image file (e.g., PNG, JPEG, etc.), or the like that may include information from the transaction that may be recorded and provided as proof of the transaction, purchase, processing, completion, or the like. The digital receipt may be generated as an XML or HTML file, which may be accessible and loaded via a webpage, such as when navigating to a webpage address. Other data containers, files, and online addresses may also be utilized for receipt generation and provision. For example, PDF or PNG files may be generated and/or utilized for receipt provision, as well as HTML encoding, XML encoding and/or files, and the like. At step 408, an address or link and file for the digital receipt is created. For example, payment terminal device 110 in system 100 and system environment 200 may create such data, which may be performed in conjunction with transaction processor 110 and/or server backend 220. Thus, additional links, data objects, online content, and the like may be generated that enables transmitting, providing, and/or loading the digital receipt on a computing device, such as a mobile device of a user. For example, a webpage address or link to a webpage with a webpage file (e.g., HTML or XML) may be created, however other files and formats also be used.

At step 410, the file is persisted in association with the address or link with a storage system. For example, payment terminal device 110 in system 100 and system environment 200 may transmit such data for storage by transaction processor 130 and server backend 220, respectively. In order to make the receipt accessible for a period of time, such as a required amount of time by law, regulation, policy, or the like, the digital receipt and/or other data for the receipt and transaction history may be required to be stored with an online data storage, database, or other data store for receipt data for a merchant. The online storage may include cloud-based or other large data storages that may store data for receipts with corresponding identifiers allowing for data retrieval. For digital receipts that may be accessed through links and web addresses, the data file for the digital receipt may be stored for access via the corresponding webpage when the address is navigated to by an application. Other data files may also be stored and referenced by addresses for storage locations, identifiers for the data, objects, or files, and/or links to such storage locations and/or files (e.g., HTML or XML encoding or files). Other data storage systems may also be used, such as file storages for PDF or PNG files, Word documents, and the like for other types of files.

At step 412, a message for the digital receipt is generated that causes applications to load the digital receipt. In this regard, payment terminal device 110 in system 100 and system environment 200 may generate the message using a short-range wireless protocol and messaging format, such as NDEF or the like. The message may be generated by adding, embedding, or otherwise providing the address, link, or other identifier for retrieval of the digital receipt from the online storage in the message. For example, a message protocol for short-range wireless communications may allow the webpage address, a link, and/or executable command or operation to be embedded, added, or included in a field. The field may correspond to a header, message body, or the like, and may cause the message to open an application and load the digital receipt or navigate to the digital receipt's address for loading of the digital receipt. In some embodiments, the message and/or the receiving device's application or operating system may first prompt the user to open and load the digital receipt or navigate to the webpage and digital receipt. In some embodiments, the data file or other data for the digital receipt may be included in the message or as an attachment to the message. Such inclusion of a data file in a message may be performed based on message data size constraints and requirements, such as by encoding the digital receipt in HTML or XML data and/or files. However, larger files sizes may also be used for different data communication protocols and mechanisms. Further, such messages may be refused or prevented from opening/loading to protect computing devices, and thus a corresponding link, address, or identifier may be added to the message to allow for certain devices to load the digital receipt without invoking a security alert and quarantine operation to prevent malicious computing actions.

At step 414, the message is broadcast over short-range wireless communications. For example, payment terminal device 110 in system 100 of FIG. 1 may broadcast, or otherwise transmit in a directed or undirected manner, the message to user device 140. Such interactions may also be shown by payment terminal device 110 with user device 140 using transmission 222 in system environment 200. Broadcasting may be performed for a set period of time over the short-range wireless communications using a corresponding short-range wireless protocol. In this regard, a wireless transceiver of the payment terminal, POS device, or other merchant device may begin to transmit the message, such as continuously or periodically, for a time period with an instruction for the user to place their mobile, wearable, or other device within a proximity to merchant's device. The option to extend or rebroadcast may also be provided on the merchant's device at or near an end to the broadcast. If transmission and receipt of the message and corresponding digital receipt is not performed or does not occur, such as if the mobile device cannot or does not receive the message, another option to transmit the message and/or digital receipt may occur. Such option may correspond to display of a barcode or QR code that includes encoded data for the webpage address and/or digital receipt, as well as receipt printing and the like.

Figure 5:
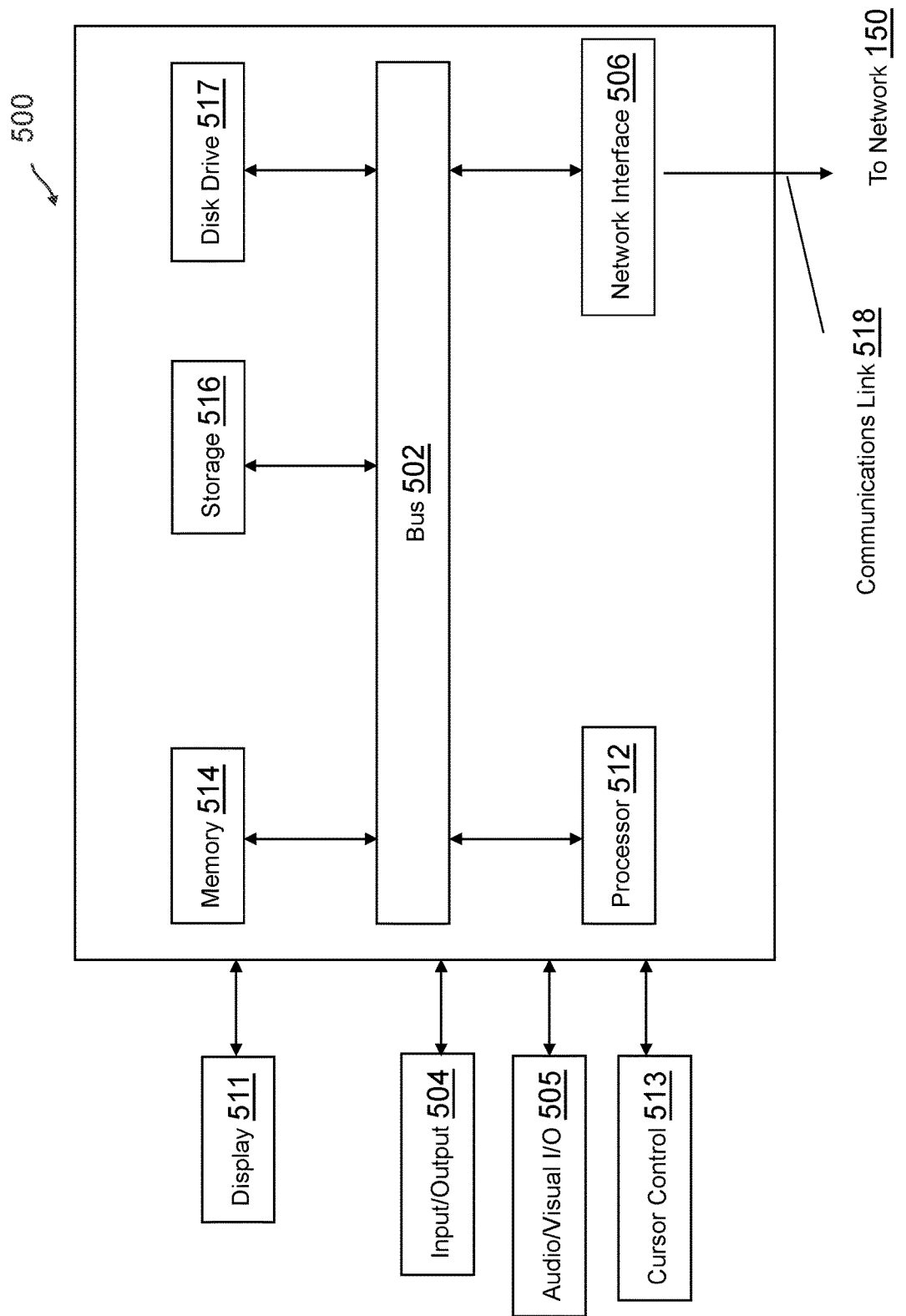
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network.

It should be appreciated that each of the devices utilized by users and service providers may be implemented as computer system 500 in a manner as follows. For example, payment terminal device 110, transaction processor 130, user device 140 and/or one or more of the servers, devices, or other components for service provider system 120 in FIG. 1 may be implemented by computer system 500. As such, payment terminal device 110, transaction processor 130, and/or user device 140

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory; and
one or more hardware processors coupled to the non-transitory memory and configured to read instructions from the non-transitory memory to cause the system to perform operations comprising:
receiving transaction data for a transaction processed by the system using payment data associated with a user;
generating a digital receipt for the transaction based on the transaction data and the payment data;
generating a data file for a webpage where the digital receipt will be accessible from;
determining a webpage address for the webpage that provides access to the digital receipt, wherein the webpage address allows a retrieval of the data file for the digital receipt from an online receipt storage system;
storing the data file for the digital receipt in association with the webpage address with the online receipt storage system, wherein the online receipt storage system enables the data file to be accessed via the webpage;
determining an executable command based on a near field communications (NFC) protocol usable to transmit an electronic message associated with the digital receipt to a mobile device, wherein the executable command enables an automatic navigation to the webpage address in a browser application on the mobile device;
generating the electronic message comprising an encoding of the webpage address embedded in at least one field of the electronic message and the executable command embedding in the at least one field; and
broadcasting, within a proximity range of the system via an NFC transceiver connectable with the system independent of utilizing user contact information for the user, the electronic message using an active component of the NFC transceiver and an NFC protocol for short-range wireless communications.

2. The system of claim 1, wherein the electronic message allows for the retrieval of the digital receipt without the user entering the user contact information or user personal information.

3. The system of claim 2, wherein, prior to the generating the digital receipt, the operations further comprise:
receiving a request to transmit the digital receipt via the short-range wireless communications during a checkout for the transaction,
and wherein the webpage address is determined based on the received request.

4. The system of claim 1, wherein the operations further comprise:
receiving an indication that the electronic message was not received by the mobile device of the user;
generating a quick response (QR) code that includes encoded data for the digital receipt; and
displaying the QR code on a display component associated with the system.

5. The system of claim 1, wherein the electronic message is generated using a near field communication (NFC) standard for providing the webpage address with the executable command to the mobile device without requiring a message file attachment.

6. The system of claim 1, wherein the electronic message is configured to cause a prompt on the mobile device associated with navigating to the webpage address in the browser application.

7. The system of claim 1, wherein the operations further comprise:
outputting instructions for receiving the digital receipt via the short-range wireless communications, wherein the instructions for receiving the digital receipt include at least one of a prompt to activate a short-range wireless component on the mobile device, a distance for the proximity range, a request to tap the mobile device to a component of the system associated with the broadcasting, or a duration of the broadcasting.

8. The system of claim 7, wherein the broadcasting occurs for a finite length of time, and wherein operations further comprise:
requesting, at an expiration of the finite length of time from the user or another user utilizing the system, whether to perform a rebroadcasting of the electronic message.

9. The system of claim 1, wherein the storing the digital receipt comprises storing an extensible markup language (XML) file or a hypertext markup language (HTML) file corresponding to the digital receipt for the webpage with the online receipt storage system.

10. The system of claim 1, further comprising:
a display configured to output a notification associated with the broadcasting;
a wireless transceiver configured to transmit the short-range wireless communications; and
a payment data reader component configured to receive the payment data.

11. A payment terminal device comprising:
a card reader component configured to read payment card data;
a short-range wireless transceiver configured to receive at least one of the payment card data or digital wallet payment data and broadcast electronic messages via short-range wireless communications;
a non-transitory memory; and
one or more hardware processors coupled to the non-transitory memory and configured to read instructions from the non-transitory memory to cause the payment terminal device to perform operations comprising:
generating a digital receipt for a transaction processed using the at least one of the card reader component or the short-range wireless transceiver based at least on transaction data for the transaction with a user entered to the payment terminal device;
generating a data file for a webpage where the digital receipt is to be provided for access;
determining a webpage address for the webpage that provides the digital receipt, wherein the webpage address allows a retrieval, from an online receipt storage system, of the data file for the digital receipt;
requesting, from the online receipt storage system, a storage of the data file for the digital receipt in association with the webpage address, wherein the online receipt storage system provides the data file for access via the webpage;
determining an executable command based a communication protocol usable to transmit an electronic message associated with the digital receipt to a mobile device, wherein the executable command enables an automatic navigation to the webpage address in a browser application on the mobile device;

generating the electronic message using an NFC protocol to include a message content structured to contain the executable command and the webpage address encoded in the electronic message, wherein the data field enables an application on a mobile device receiving the electronic message to automatically load the webpage address; and broadcasting, via an active component of the short-range wireless transceiver that is configured to transmit the electronic message within a proximity range of the payment terminal device, the electronic message using the short-range wireless communications corresponding to the NFC protocol independent of identifying information for the user.

12. The payment terminal device of claim 11, further comprising:

a display configured to output instructions for use of the mobile device to receive the electronic message via the short-range wireless communications, wherein the operations further comprise:

outputting, via the display, the instructions for use during the broadcasting.

13. The payment terminal device of claim 11, wherein the active component configured to broadcast the electronic message using the communication protocol is activated on the payment terminal device in response to a selection on the payment terminal device for a transmission of the digital receipt via the short-range wireless communications.

14. The payment terminal device of claim 11, wherein, prior to the generating the digital receipt, the operations further comprise:

requesting a receipt selection for one of a physical receipt or a transmission of the digital receipt via one of a text message, an email address, or the short-range wireless communications, and wherein the operations are performed in response to the receipt selection for the transmission of the digital receipt via the short-range wireless communications.

15. The payment terminal device of claim 11, wherein the digital receipt is stored in a data file, and wherein the webpage address comprises a link for the data file.

16. A method comprising:

receiving transaction data for a transaction processed by a payment terminal device using payment data associated with a user;

generating a digital receipt for the transaction based on the transaction data and the payment data;

generating a data file for a webpage where the digital receipt will be accessible from;

determining a webpage address for the webpage that provides the digital receipt, wherein the webpage address allows a retrieval of the data file for the digital receipt from an online receipt storage system;

storing the data file for the digital receipt in association with the webpage address with the online receipt storage system, wherein the online receipt storage system enables the data file to be accessed via the webpage;

determining an executable command based a protocol for short-range wireless communications that is usable to transmit an electronic message associated with the digital receipt to a mobile device of the user, wherein the executable command enables an automatic navigation to the webpage address in a browser application on the mobile device;

generating the electronic message comprising a message structured to encode the webpage address and the executable command; and broadcasting, within a proximity range of the payment terminal device via an active component of a transceiver corresponding to the protocol, the electronic message using short-range wireless communications independent of utilizing user contact information for the user, wherein the transceiver is part of or connected to the payment terminal device.

17. The method of claim 16, wherein the electronic message allows for the retrieval of the digital receipt without the user entering the user contact information or user personal information.

18. The method of claim 17, wherein, prior to the generating the digital receipt, the method further comprises:

receiving a request to transmit the digital receipt via the short-range wireless communications during a checkout for the transaction, and wherein the webpage address is determined based on the received request.

19. The method of claim 16, further comprising:

receiving an indication that the electronic message was not received by the mobile device of the user;

generating a quick response (QR) code that includes encoded data for the digital receipt; and displaying the QR code on a display component associated with the payment terminal device.

20. The method of claim 16, wherein the electronic message is generated using a near field communication (NFC) standard for providing the webpage address with the executable command to the mobile device without requiring a message file attachment.

* * * * *